(No Model.)
J. M. KEPLER.
FISHING REEL.
No. 412,629. Patented Oct. 8, 1889.
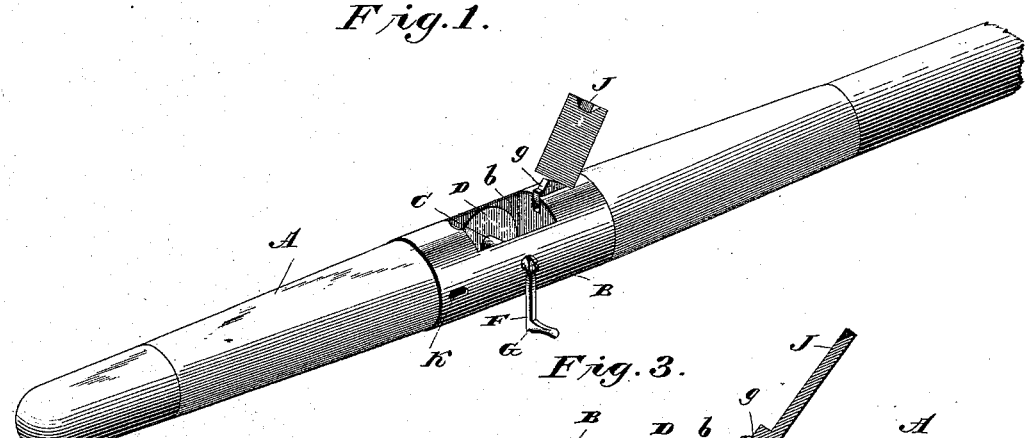
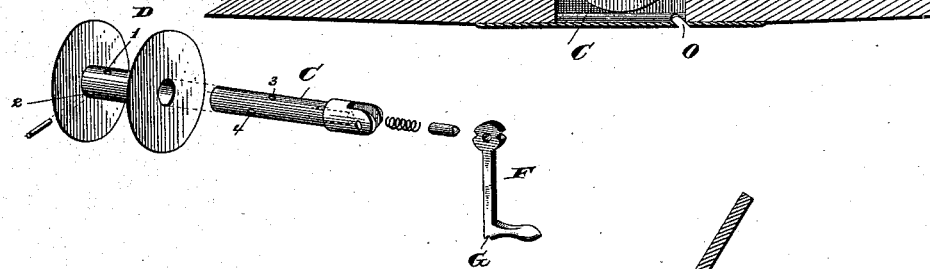
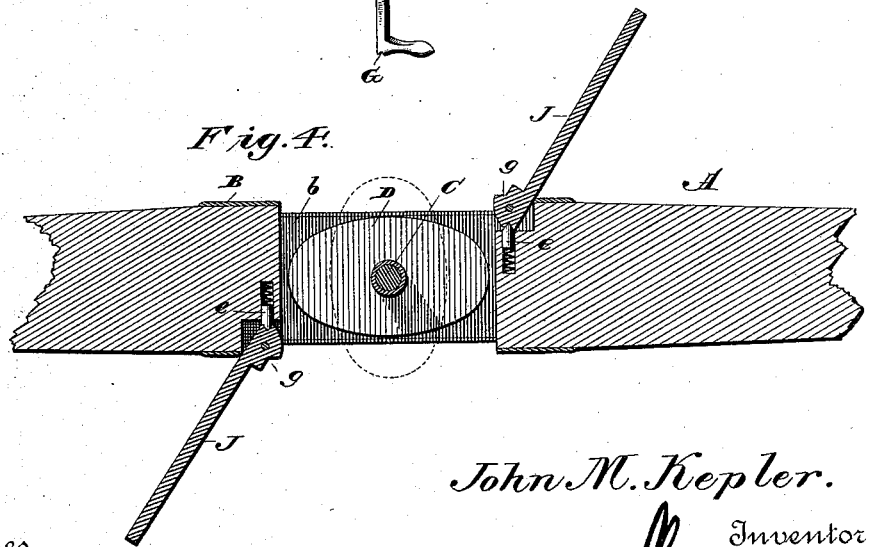
John M. Kepler.
Inventor
Witnesses

UNITED STATES PATENT OFFICE.

JOHN M. KEPLER, OF CORRY, PENNSYLVANIA.

FISHING-REEL.

SPECIFICATION forming part of Letters Patent No. 412,629, dated October 8, 1889.

Application filed May 25, 1889. Serial No. 312,155. (No model.)

*To all whom it may concern:*

Be it known that I, JOHN M. KEPLER, a citizen of the United States of America, residing at Corry, in the county of Erie and State of Pennsylvania, have invented certain new and useful Improvements in Reels for Fishing-Rods; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to combined fishing poles and reels; and it consists in the improved construction hereinafter described and set forth.

In the accompanying drawings, Figure 1 is a perspective view of a section of a fishing pole or rod, showing my invention applied thereto. Fig. 2 is a perspective view of the reel and crank therefor detached. Fig. 3 is a longitudinal sectional view. Fig. 4 is a sectional view of a modification of my invention.

A refers to the end or butt section of a fishing-pole, which is provided with a mortise, over which is placed a sleeve B, said sleeve being provided on its interior with side plates *b b*, having perforations through which passes the stem C of the crank, the stem also passing through the hollow central portion of the spool or reel D. The spool or reel D is provided with side plates and with perforations 1 and 2, which register with perforations 3 and 4 in the stem C, and these parts are rigidly united to each other by passing a pin or rivet through the perforations 1 and 3. The perforations 2 and 4 register with each other, so that the end of the line may be made fast to the spool. The casing B is provided with a slot O, through which the line passes. A covering J is pivoted to the casing, and said covering is provided with a notched lug *g*, with which a spring-actuated bolt *e* engages to hold the cover closed. The shank C is for a part of its distance hollow, and within said hollow portion is secured a spiral spring upon which bears a spring-actuated bolt which engages with the notched end of the crank-handle F to hold said crank-handle, so that it will project either outwardly or inwardly. When the crank-handle is turned to project inwardly, it passes into a recess K, formed in the casing and rod, and the handle is provided with a notch G, with which the thumb may engage to remove the handle from the recess.

In Fig. 4 I have shown a modification of my invention, in which case two hinged covers are employed, and when such covers are used the end plates of the spool or reel are of an oval shape to accommodate a larger line, and when in use the covers can be thrown back.

I am aware that prior to my invention it has been proposed to recess a fishing-pole and locate a reel within said recess, and I do not claim such construction, broadly; but

What I claim as new, and desire to secure by Letters Patent, is—

1. In combination with a fishing-rod or section thereof, a reel journaled within an opening formed therein, said reel being mounted upon and secured to a shaft having a crank-arm pivoted thereto, said shaft containing a spring-actuated bolt which engages with notches formed in the crank-handle adjacent to its pivot, substantially as and for the purpose set forth.

2. In combination with a fishing-pole or section thereof having a recess in which is journaled a reel, a cover for said recess, said cover being pivoted and provided adjacent to its pivot with a notch or recess with which a spring-actuated bolt engages for holding the cover closed, substantially as shown, and for the purpose set forth.

3. In combination with a fishing-rod or section thereof, a reel located within a mortise formed in said section, a casing adapted to inclose the reel, said casing having on one side a slot through which the line passes, and opposite thereto a cover, and a pivoted crank-handle for rotating the reel, said handle being adapted to be turned upon its pivot and enter a recess in the casing to lock the reel against rotation, substantially as and for the purpose set forth.

4. In combination with a section of a fishing-rod having a mortise, within which is located a reel, a casing adapted to be secured around said mortise, inner side plates $b\ b$, against which the flanges of the reel abut, said casing having a cover, the slot through which the line passes, openings through which the shaft upon which the reel is mounted passes, and an opening in which the crank-handle can be turned, substantially as and for the purpose set forth.

In testimony whereof I affix my signature in presence of two witnesses.

JOHN M. KEPLER.

Witnesses:
H. J. MANLEY,
E. M. CHIDESTER.